United States Patent
Kühn et al.

(10) Patent No.: US 6,741,854 B2
(45) Date of Patent: *May 25, 2004

(54) METHOD FOR TRANSFERRING OPERATING PARAMETERS FROM A CONTROL CENTER TO A LOCALLY LIMITED WIRELESS TELECOMMUNICATIONS SYSTEM AND A CORRESPONDING WIRELESS TELECOMMUNICATIONS SYSTEM

(75) Inventors: Edgar Kühn, Stuttgart (DE); Christoph Sperber, Pforzheim (DE); Ulrich Barth, Korntal-Münchingen (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 265 days.

(21) Appl. No.: 09/380,496

(22) PCT Filed: Dec. 29, 1998

(86) PCT No.: PCT/EP98/08581

§ 371 (c)(1), (2), (4) Date: Sep. 2, 1999

(87) PCT Pub. No.: WO99/35864

PCT Pub. Date: Jul. 15, 1999

(65) Prior Publication Data

US 2003/0032420 A1 Feb. 13, 2003

(30) Foreign Application Priority Data

Jan. 8, 1998 (DE) .......................................... 198 00 378

(51) Int. Cl.⁷ .......................... H04M 3/00; H04M 1/00; H04B 1/38

(52) U.S. Cl. ........................ 455/419; 455/462; 455/465; 455/552

(58) Field of Search ................................ 455/418, 419, 455/420, 462, 465, 422, 552, 426, 553

(56) References Cited

U.S. PATENT DOCUMENTS

| | | | |
|---|---|---|---|
| 5,594,782 A | | 1/1997 | Zicker et al. |
| 5,761,618 A | * | 6/1998 | Lynch et al. ................. 455/419 |

FOREIGN PATENT DOCUMENTS

| | | |
|---|---|---|
| EP | 0 802 692 A2 | 10/1997 |
| GB | 2 305 822 A | 4/1997 |
| WO | WO 97/47125 | 12/1997 |

OTHER PUBLICATIONS

Michel Mouly et al, The GSM System for Mobile Communications, pp. 424–430, 1992.

* cited by examiner

Primary Examiner—Nguyen T. Vo
(74) Attorney, Agent, or Firm—Sughrue Mion, PLLC

(57) ABSTRACT

A cordless telecommunications system (CTS) with a base station (CTS-FP) and with at least one mobile station (MS) initialised at the base station (CTS-FP), for carrying out a process for transmitting operating parameters from a control centre (Z) of a superimposed telecommunications network (PLMN; PSTN, ISDN), which transmits operating parameters initially to the base station (CTS-FP) or to one of the mobile stations (MS) of the cordless telecommunications system (CTS) and then relays the operating parameters to as far as possible all initialised mobile stations or to the base station (CTS-FP) as well as to as far as possible all other initialised mobile stations (MS) is proposed. Thus, new operating parameters can easily be distributed centrally to one or more limited cordless telecommunications systems and can be activated.

22 Claims, 2 Drawing Sheets

US 6,741,854 B2

METHOD FOR TRANSFERRING OPERATING PARAMETERS FROM A CONTROL CENTER TO A LOCALLY LIMITED WIRELESS TELECOMMUNICATIONS SYSTEM AND A CORRESPONDING WIRELESS TELECOMMUNICATIONS SYSTEM

BACKGROUND OF THE INVENTION

The present invention relates to both a process for the transmission of operating parameters from a control centre to a positionally limited cordless telecommunications system with a base station and with at least one mobile station initialised at it, and a corresponding cordless telecommunications system for carrying out this transmission process with a base station and with at least one mobile station initialised at the base station.

The term "initialised" denotes any mobile station fundamentally set up for operation with the base station and the term "registered" an initialised mobile station communicating with the base station.

A known positionally unlimited telecommunications system with a stationary radio device (base station) and with moving radio devices (mobile stations) which both exchange radio signals with one another via a radio connection is described in the book "The GSM System for Mobile Communications" written by M. Mouly and M. B. Pautet 1992 and published in-house at Palaiseau, France. The radio communications system described in the book is the public mobile radio system "global system for mobile communications" (GSM) of which the technical components satisfy the standard with the same name "GSM".

It is stated on pages 424 to 427 in section 6.3.9 and 6.3.10 of this book that operating parameters of a mobile station change when their location changes. For example, the frequency properties of a frequency hopping channel have to change synchronously with other mobile stations in order to cope with a change in the positionally different frequencies. As a radio signalling channel (BCCH: broadcast control channel) is provided in the GSM network, a signalling connection to the mobile stations can be created without difficulty at any time for transmitting operating parameters.

In cordless positionally limited telecommunications systems (CTS=cordless telephone system) with which a certain number of mobile stations are operated by a base station with a positionally limited transmission range—without a BCCH having to be provided—, central transmission of operating parameters to the base station and to all mobile stations initialised at it is desirable in each case. Sets of operating parameters for the CTS, for example frequency lists or frequency hopping sequences, can change according to the requirements of the network operator (hereinafter also called operator for short) of a public land mobile network (PLMN) or an authorised institution (for example a state regulatory authority issuing radio frequency licences to the users). These changes must be distributable to the base stations (CTS-FP=CTS-fixed part) and to the mobile stations (MS=mobile station) initialised at them, regardless of whether or not the mobile stations are registered in the cordless telecommunications system at the time of distribution. Furthermore, mobile stations can be registered either at the CTS or at the GSM (so-called "dual mode terminals"), according to whether or not they are located within the transmission range of the CTS. A CTS is also subject to the constraint that no parameters can be transmitted via a broadcast carrier, and, moreover, does not necessarily have PLMN coverage:

For example, if a new CTS is to be initialised for the first time when a periodic operating parameter is to be checked by the CTS, when changes are effected by a control centre (network operator or authorised institution) or when the CTS location changes (for example owing to a move). In such cases, it is necessary to transmit (update) operating parameters (sets of parameters) to the CTS-FP and to its MS.

SUMMARY OF THE INVENTION

It is accordingly the object of the present invention to provide a transmission process with which operating parameters can be distributed centrally in the easiest manner to one or more positionally limited cordless telecommunications systems and can be activated, and to provide a corresponding cordless telecommunications system.

This object is achieved according to the present invention by a process for the transmission of operating parameters to a positionally limited cordless telecommunications system with a base station and at least one mobile station initialized at the base station, from a control center of a superimposed telecommunications network, comprising the steps of initially transmitting the operating parameters via the superimposed telecommunications network to the base station or to one of its mobile stations, relaying the operating parameters from the base station to as far as possible all initialized mobile stations or from one mobile station to the base station and then as far as possible to all other initialized mobile stations, and then activating the operating parameters. The invention is further directed to a cordless telecommunications system employing such a process.

The object is therefore achieved according to the invention in that via a superimposed telecommunications network, the operating parameters are initially transmitted to the base station or to one of its mobile stations and are then relayed from the base station to as far as possible all initialised mobile stations or from one mobile station to the base station and as far as possible to all other initialised mobile stations and are activated. For this purpose, the control centre is connected to the superimposed telecommunications network (so-called "overlay network").

The process according to the invention allows the control centre and therefore also the PLMN operator or the authorised institution directly or indirectly to make changes to CTS operating parameters (sets of parameters) and to activate these operating parameters. Operating parameters are transferred in two stages: the operating parameters are initially transferred from the control centre to the CTS, namely to the base station or to one of its mobile stations. These operating parameters are then distributed within the CTS independently of the control centre, i.e. relayed to the base and mobile stations present there.

With a preferred embodiment of the transmission process according to the invention, the superimposed telecommunications network is a wired telecommunications network, for example a PSTN (=public switched telephone network) or an ISDN (=integrated services digital network). The transfer of operating parameters can be initiated in that the network operator or the authorised institution calls the base station via the PSTN or ISDN and transmits the operating parameters to the base station.

In particular during a periodic operating parameter check by the base station, it is advantageous if the transmission of operating parameters is effected by the base station or by one mobile station, i.e. by the CTS itself. For example, the base station is able to call the network operator via the PSTN or the ISDN. Therefore, a call back through the network operator or the authorised institution can optionally be effected.

Alternatively, a mobile station calls the network operator via the PLMN, temporarily stores the operating parameters on its subscriber identification module or in other mobile equipment and transfers it to the base station at a later stage.

In particular if operating parameters are transmitted by the network operator to a mobile station initialised at the base station but not registered at the base station owing to an excessive distance, this one mobile station initially temporarily stores the operating parameters transmitted to it and relays them to the base station at a later stage when it is located at an appropriate transmission range. The network operator or the authorised institution calls a mobile station via PLMN. The mobile station temporarily stores the operating parameters in the SIM or ME and later transfers them to the base station. Transfer from the network operator to the mobile station can be effected via a superimposed cordless network (for example via the GSM network), by means of which the transmitted operating parameters can also be relayed from the mobile station directly to other mobile stations of the CTS.

In a particularly preferred embodiment of the transmission process according to the invention, only after relaying of the operating parameters to at least all registered mobile stations, these operating parameters are activated in the base station and in these mobile stations, preferably simultaneously. The unregistered mobile stations not yet communicating with the base station do not require the operating parameters immediately but at latest when they pick up the communication connection to the base station, i.e. when they are registered. This means that the distribution of operating parameters to registered mobile stations takes place in CTS mode and then the activation of the new operating parameters in the base station and in the registered mobile stations.

Although the unregistered mobile stations do not communicate with the base station, in a further advantageous embodiment of the process, the base station can relay the operating parameters to unregistered but initialised mobile stations via the or a different superimposed telecommunications network. Thus, the operating parameters can be transferred to any unregistered mobile station via a mobile radio network, for example GSM, in that the base station itself or via the network operator intentionally calls this mobile station via the GSM and transmits the operating parameters to it individually.

In a development of this embodiment of the process, it is also possible to relay the operating parameters from the base station as a short message to unregistered initialised mobile stations. The short message service SMS is already known as an optional service feature in mobile radio networks. For example, up to 160 characters can be transmitted to a subscriber by SMS, even if the mobile station is not switched on. The text is temporarily stored in the network, the presence of information signalled to the subscriber when he next switches on and is transmitted for fetching.

The operating parameters can also be relayed via a wired superimposed telecommunications system from the base station, for example via the PSTN or ISDN.

In an alternative process, on the other hand, the operating parameters, effected by the base station, are relayed via a mobile station in which the operating parameters are already activated to unregistered initialised mobile stations via a cordless superimposed telecommunications network (PLMN, for example the mobile radio network GSM). This can be effected if the mobile station(s) also unregistered in the PLMN are registered in the PLMN again at a later stage.

The base station, as soon as a formerly unregistered initialised mobile station is registered at it, preferably relays the operating parameters to this mobile station.

In a further embodiment of the process, all mobile stations initialised at the base station perform a predetermined uniform registration procedure by means of which the operating parameters are relayed from the base station to the mobile station and are activated, despite different operating parameters between base station and a mobile station. A starting sequence in the form of a predetermined frequency hop sequence is preferably used for registration. Operating parameters are distributed to initialised but unregistered mobile stations such that, after activation of the new operating parameters in the base station, these mobile stations pick up a connection to the base station and load and activate the operating parameters via the known frequency hop sequence starting sequence which is a shared secret between the base station and the initialised mobile stations. This starting sequence ensures that it is still possible to pick up a connection after all the aforementioned transmission processes have failed.

The above-described processes have the advantage for the user that they can take place in the background and automatically.

Further certainty is obtained in that unregistered initialised mobile stations can be connected to the base station manually via a wired or cordless interface associated with the base station for the transmission of operating parameters. The mobile station can be connected, for example, to an infrared (IR) interface of the base station and the operating parameters can be activated on completion of the transfer. This transmission process, which can be used, for example, as an "emergency scenario" if the transmission of operating parameters via the PLMN (air interface) has not previously been successful, could be started on its way in that the base station and the associated mobile station are brought manually into a corresponding "emergency mode".

The new operating parameters can be activated directly in time or at a fixed time. The relaying of operating parameters to initialised mobile stations and the activation thereof can take place after a time delay according to their state of registration (registered or unregistered) and the transmission process used in each case.

Preferably, a mobile station is initialised or initialisable at a plurality of cordless telecommunications systems.

These different variations of the transmission process can be used individually or in any combination, and predetermined escalation stages can be provided for them in order to supply all initialised mobile stations in succession with the new operating parameters. Furthermore, the aforementioned variations of the transmission process can be applied both in a BCCH-free protocol (BCCH=broadcast channel) and when using a BCCH channel. Moreover, these variations of the transmission process can be applied to "half rate traffic channels" in addition to "full rate traffic channels". The transmission process according to the invention can be applied to such TDMA systems (TDMA=time division multiple access) or also to CDMA systems (CDMA=code division multiple access) and to mixtures of them. Carrier frequencies, frequency hop diagrams, HF performance parameters, starting sequences or radio transmission modes (half/full-rate, CDMA codes) etc., for example, can be transmitted as operating parameters.

The above-mentioned object is achieved according to the invention with a cordless telecommunications system of the type mentioned at the outset in that, via a superimposed telecommunications network from a control centre, operating parameters can initially be transmitted to the base station or to one of its mobile stations and can then be relayed from the base station to as far as possible all initialised mobile stations or from one mobile station to the base station as well as to as far as possible all other initialised mobile stations and can be activated.

Further advantages of the invention will emerge from the description and the drawings. Similarly, the features which have been mentioned hereinbefore and are listed hereinafter can be used according to the invention individually as such or together in any combinations. The design illustrated and described should not be considered as exhaustive, but serves as an example for explaining the invention.

BRIEF DESCRIPTION OF THE DRAWING

The invention is illustrated in FIGS. 1 and 2 and will be described in detail with reference to an embodiment.

DESCRIPTION OF THE INVENTION

Figure 1:
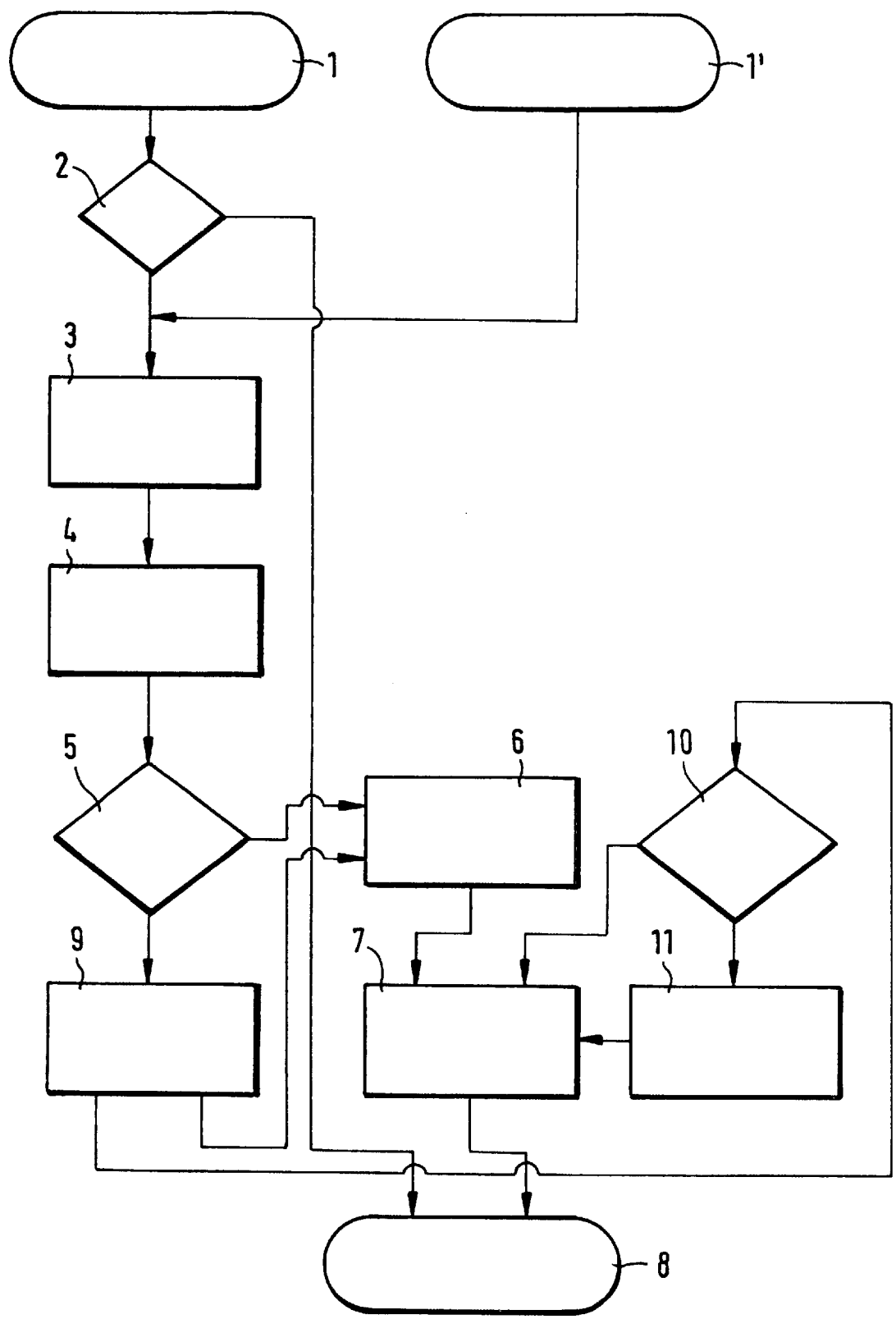
FIG. 1 is a markedly schematic view of a flow chart according to the invention for the distribution of operating parameters.
Figure 2:
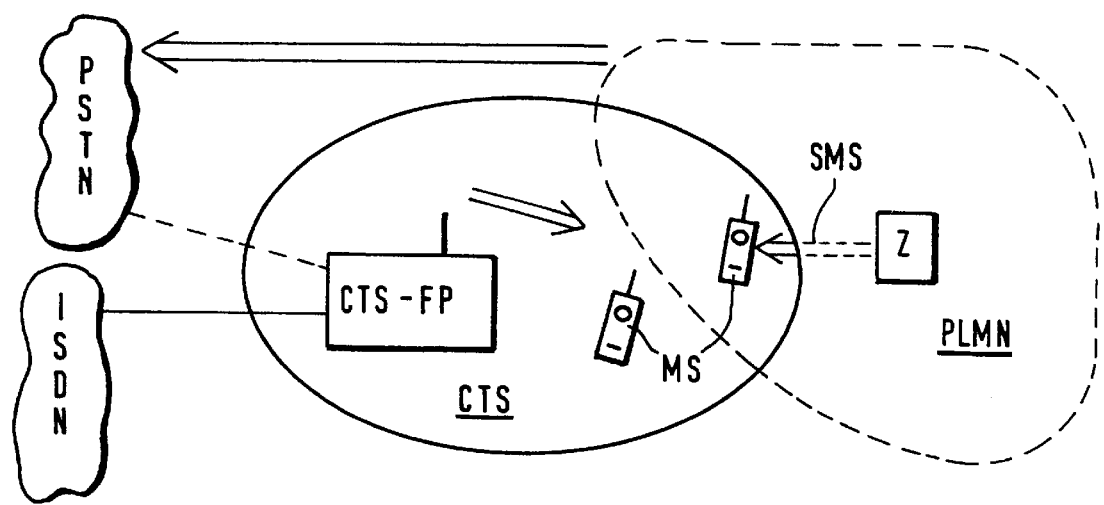
FIG. 2 is a schematic view of the construction of a cordless telecommunications system for carrying out this process. The two figures will be considered together in the following description.

A cordless telecommunications system CTS with a base station CTS-FP and with at least one mobile station MS initialised at the base station is shown, in which a control centre Z of a superimposed telecommunications network PLMN transmits operating parameters via the superimposed telecommunications network initially to the base station CTS-FP (via a further PSTN or ISDN network) or to one of the mobile stations MS of the cordless telecommunications system CTS (via the air interface of the PLMN). From there, the operating parameters are then relayed as far as possible to all initialised mobile stations or to the base station as well as to as far as possible all other initialised mobile stations for activation.

The flow chart shows two variations of the process for the transmission of operating parameters to a cordless telephone system (CTS), namely the initiation of the transmission (transfer) by the CTS itself (step 1) or the initiation of the transmission by a network operator (step 1').

In the first case (step 1), it is initially queried (step 2) whether or not the operating parameters to be transmitted differ from the formerly used operating parameter. If not, no transmission or update is required, so the transfer and activation of the operating parameters have already ended (step 8).

If new operating parameters are to be transmitted or if the transmission is initiated by the network operator (step 1'), the new operating parameters are transmitted (loaded) by the network operator to the base station, for example to a CTS-FP (step 3). From the base station, the new operating parameters are distributed or relayed to the mobile stations (MS) registered at it (step 4).

In a further step 5, it is queried whether all mobile stations initialised at the base station are registered and the distribution of the operating parameters has therefore already ended. If so, the new operating parameters are activated both in the base station (step 6) and in the mobile stations (step 7), so the transfer and activation of the new operating parameters have ended (step 8). If the query in step 5 produces a negative response, an attempt is made in a further step 9 to relay the new operating parameters, for example by means of SMS via PLMN to the remaining, as yet unregistered mobile stations. The new operating parameters are then activated in the base station and in the registered mobile stations (step 6 and step 7).

In a further step 10 also following step 9, it is checked in each case whether or not the transmission of the new operating parameters to an unregistered mobile station was successful. If so, the new operating parameters are also activated in this mobile station (step 7). If not, the new operating parameters are relayed and distributed to the unregistered mobile station at a later stage, for example via a wired interface (step 11), whereupon the new operating parameters are also activated in this mobile station (step 7). If the new operating parameters have been relayed to the base station and to all mobile stations initialised at it and have been activated, the transmission process has ended (step 8).

What is claimed is:

1. A process for transmitting operating parameters to a positionally limited cordless telecommunications system (CTS) with a base station (CTS-FP) and with at least one mobile station (MS) initialized at the base station (CTS-FP), from a control center (Z) of a superimposed telecommunications network (PLMN; PSTN; ISDN), wherein, via the superimposed telecommunications network, the operating parameters are initially transmitted to one of the base station's (CTS-FP) mobile stations (MS) and are then relayed from the one mobile station (MS) to the base station (CTS-FP) and, as far as possible, to all other initialized mobile stations (MS) and are activated.

2. A process-according to claim 1, characterised in that the superimposed telecommunications network is a wired telecommunications network (PSTN, ISDN) to which the base station (CTS-FP) is connected or is a cordless telecommunications network (PLMN) to which the base station (CTS-FP) or one mobile station (MS) are cordlessly connected.

3. A process according to claim 1, characterised in that one mobile station (MS) initially temporarily stores the operating parameters transmitted to it and only later conveys them to the base station (CTS-FP) or further mobile stations (MS).

4. A process according to claim 1 characterised in that, after relaying of the operating parameters to all registered mobile stations (MS), these operating parameters are activated in the base station (CTS-FP) and in these mobile stations (MS).

5. A process according to claim 1, characterised in that, from the base station (CTS-FP), the operating parameters are relayed to unregistered but initialized mobile stations (MS) in that the operating parameters are initially conveyed to the superimposed telecommunications network or to a different superimposed telecommunications network and are then relayed cordlessly from the superimposed telecommunications network or the different superimposed telecommunications network to these unregistered mobile stations (MS).

6. A process according to claim 5, characterised in that the operating parameters, effected by the base station (CTS-FP), are relayed via a mobile station (MS) in which the operating parameters are already activated, to unregistered initialised mobile stations (MS) via a cordless superimposed telecommunications network.

7. A process according to claim 5, wherein the operating parameters are relayed cordlessly from the superimposed telecommunications network or the different superimposed telecommunications network to the unregistered mobile stations (MS) as a short message (SMS).

8. A process according to claim 1 characterised in that the base station (CTS-FP), as soon as a formerly unregistered initialised mobile station (MS) is registered at it, relays the operating parameters to this mobile station (MS).

9. A process according to claim 1, characterised in that all mobile stations (MS) initialized at the base station (CTS-FP) perform a predetermined uniform registration procedure, by means of which the operating parameters are relayed from the base station (CTS-FP) to the mobile station (MS) and are activated, despite different operating parameters between the base station (CTS-FP) and the mobile station (MS).

10. A process according to claim 9, wherein the predetermined uniform registration procedure comprises a predetermined sequence of frequency hops.

11. A process according to claim 1, characterised in that unregistered but initialized mobile stations (MS) are connected via an interface associated with the base station (CTS-FP), to the base station (CTS-FP) for transmitting the operating parameters.

12. A process according to claim 11, wherein the interface comprises a cordless interface.

13. A process according to claim 1, characterised in that the relaying of the operating parameters to initialized mobile stations (MS), the activation thereof according to their state of registration, and a respectively used transmission process take place after a time delay.

14. A process according to claim 1 characterised in that a mobile station (MS) can be initialised at a plurality of cordless telecommunications systems (CTS).

15. A process according to claim 1 characterised in that the transmission of the operating parameters from the control centre (Z) or from the base station (CTS-FP) is effected at periodic time intervals.

16. A cordless telecommunications system (CTS) with a base station (CTS-FP) and with at least one mobile station (MS) initialized at the base station (CTS-FP), in which a control center (Z) of a superimposed telecommunications network (PLMN; PSTN, ISDN), via the superimposed telecommunications network, transmits operating parameters initially to one of the mobile stations (MS) of the cordless telecommunications system (CTS), and the one mobile station (MS) relays the operating parameters to the base station (CTS-FP) and to, as far as possible, all other initialized mobile stations (MS) for activation.

17. A method, comprising:
transmitting operating parameters from a control center of a telecommunications network to a specific mobile station of a plurality of mobile stations initialized at a base station of a cordless telecommunications network;
wherein the telecommunications network operates in a first geographical area;
wherein the cordless telecommunications system operates in a second geographical area;
wherein the first geographical area of the telecommunications network overlaps the second geographical area of the cordless telecommunications system;
wherein the operating parameters are transmitted from the control center of the telecommunications network to the specific mobile station;
wherein the operating parameters are forwarded from the specific mobile station to the base station of the cordless telecommunications system and to all mobile stations of the plurality of mobile stations that are reached by at least one of the base station and the specific mobile station; and
wherein the operating parameters are activated in the base station and in all the mobile stations that are reached.

18. A process for transmitting operating parameters to a positionally limited cordless telecommunications system (CTS) with a base station (CTS-FP) and with at least one mobile station (MS) initialized at the base station (CTS-FP), from a control center (Z) of a superimposed telecommunications network (PLMN; PSTN; ISDN), wherein, via the superimposed telecommunications network, the operating parameters are initially transmitted to the base station (CTS-FP) or to one of the base station's (CTS-FP) mobile stations (MS) and are then relayed from the base station (CTS-FP), to as far as possible, all initialized mobile stations or from the one mobile station (MS) to the base station (CTS-FP) and, as far as possible, to all other initialized mobile stations (MS) and are activated; and wherein, from the base station (CTS-FP), the operating parameters are relayed to unregistered but initialized mobile stations (MS) in that the operating parameters are initially conveyed to the superimposed telecommunications network or to a different superimposed telecommunications network and are then relayed cordlessly from the superimposed telecommunications network or the different superimposed telecommunications network to these unregistered mobile stations (MS).

19. A process according to claim 18, wherein the operating parameters, effected by the base station (CTS-FP), are relayed via a mobile station (MS), in which the operating parameters are already activated, to unregistered initialized mobile stations (MS) via a cordless superimposed telecommunications network.

20. A process according to claim 18, wherein the operating parameters are relayed cordlessly from the superimposed telecommunications network or the different superimposed telecommunications network to the unregistered mobile stations (MS) as a short message (SMS).

21. A process for transmitting operating parameters to a positionally limited cordless telecommunications system (CTS) with a base station (CTS-FP) and with at least one mobile station (MS) initialized at the base station (CTS-FP), from a control center (Z) of a superimposed telecommunications network (PLMN; PSTN; ISDN), wherein, via the superimposed telecommunications network, the operating parameters are initially transmitted to the base station (CTS-FP) or to one of the base station's (CTS-FP) mobile stations (MS) and are then relayed from the base station (CTS-FP), to as far as possible, all initialized mobile stations or from the one mobile station (MS) to the base station (CTS-FP) and, as far as possible, to all other initialized mobile stations (MS) and are activated; and wherein all mobile stations (MS) initialized at the base station (CTS-FP) perform a predetermined uniform registration procedure, by means of which the operating parameters are relayed from the base station (CTS-FP) to the mobile station (MS) and are activated, despite different operating parameters between the base station (CTS-FP) and the mobile station (MS).

22. A process according to claim 21, wherein the predetermined uniform registration procedure comprises a predetermined sequence of frequency hops.

* * * * *